(12) United States Patent
Nakamaru

(10) Patent No.: US 10,279,670 B2
(45) Date of Patent: May 7, 2019

(54) ANTI-VIBRATION DEVICE AND DAMPER DEVICE

(71) Applicant: YAMASHITA RUBBER CO., LTD., Saitama (JP)

(72) Inventor: Yuichi Nakamaru, Saitama (JP)

(73) Assignee: YAMASHITA RUBBER CO. LTD., Fujimino-Shi (JP)

( * ) Notice: Subject to any disclaimer, the term of this patent is extended or adjusted under 35 U.S.C. 154(b) by 0 days.

(21) Appl. No.: 15/545,281

(22) PCT Filed: Jan. 20, 2016

(86) PCT No.: PCT/JP2016/051590
§ 371 (c)(1),
(2) Date: Jul. 20, 2017

(87) PCT Pub. No.: WO2016/117611
PCT Pub. Date: Jul. 28, 2016

(65) Prior Publication Data
US 2018/0009306 A1    Jan. 11, 2018

(30) Foreign Application Priority Data
Jan. 23, 2015 (JP) ................................ 2015-011688

(51) Int. Cl.
*B60K 5/12* (2006.01)
*F16F 13/10* (2006.01)
(Continued)

(52) U.S. Cl.
CPC .......... *B60K 5/1208* (2013.01); *B60K 5/1291* (2013.01); *F16F 1/36* (2013.01);
(Continued)

(58) Field of Classification Search
CPC .. F16F 13/264; F16F 13/268; F16F 2230/183; F16F 7/00; B60K 5/1208; B60K 5/1291
See application file for complete search history.

(56) References Cited

U.S. PATENT DOCUMENTS 5,183,243 A  *  2/1993  Matsumoto ............. F16F 13/10
                                                    267/140.11
6,082,718 A      7/2000  Yamada et al.
(Continued)

FOREIGN PATENT DOCUMENTS

JP    2004044641 A    2/2004
JP    2006-170271 A   6/2006
JP    2011-064258 A   3/2011

OTHER PUBLICATIONS

CN Office Action dated Jul. 27, 2018 in application No. 201680006891.9.

*Primary Examiner* — Bradley Duckworth
(74) *Attorney, Agent, or Firm* — Maschoff Brennan

(57) ABSTRACT

Provided is an anti-vibration device which is provided between a vibration-side bracket attached to a vibration member and a non-vibration-side bracket attached to a non-vibration member, the anti-vibration device including: a first attachment member attached to the vibration-side bracket; a second attachment member attached to the non-vibration-side bracket; and an insulator provided between the first attachment member and the second attachment member, wherein the first attachment member includes a stopper portion which faces an engagement portion formed on the non-vibration-side bracket, and the insulator includes a cover portion which covers at least a surface of the stopper portion facing the engagement portion.

4 Claims, 3 Drawing Sheets

(51) Int. Cl.
  *F16F 1/36* (2006.01)
  *F16F 1/371* (2006.01)

(52) U.S. Cl.
  CPC .............. *F16F 1/371* (2013.01); *F16F 13/10* (2013.01); *F16F 13/101* (2013.01)

(56) References Cited

U.S. PATENT DOCUMENTS

| | | | |
|---|---|---|---|
| 6,176,477 B1 | 1/2001 | Takeo et al. | |
| 6,325,364 B1* | 12/2001 | Muramatsu | F16F 13/268 267/140.14 |
| 6,375,173 B1* | 4/2002 | Takashima | B60K 5/1291 267/140.13 |
| 6,527,262 B2* | 3/2003 | Hagino | F16F 13/264 267/140.14 |
| 6,659,436 B2* | 12/2003 | Muramatsu | F16F 13/264 267/140.13 |
| 6,698,732 B2* | 3/2004 | Takashima | F16F 13/105 267/140.13 |
| 6,902,156 B2* | 6/2005 | Muramatsu | F16F 13/26 267/140.15 |
| 7,140,603 B2* | 11/2006 | Maeno | B60K 5/1208 267/140.13 |
| 7,150,257 B2* | 12/2006 | Yamada | F02B 37/16 123/192.1 |
| 7,188,830 B2* | 3/2007 | Kato | F16F 13/106 267/140.14 |
| 7,210,674 B2* | 5/2007 | Maeno | F16F 13/264 267/140.13 |
| 8,579,269 B2* | 11/2013 | Takakura | F16F 1/3849 267/140.13 |
| 9,279,472 B2* | 3/2016 | Han | F16F 13/10 |
| 9,487,072 B2* | 11/2016 | Tsutsumi | F16F 13/10 |
| 9,797,468 B2* | 10/2017 | Kubota | F16F 13/105 |
| 9,895,965 B2* | 2/2018 | Mathai | B60K 5/1283 |
| 2002/0014728 A1 | 2/2002 | Takeo et al. | |
| 2003/0015831 A1 | 1/2003 | Takeo et al. | |
| 2004/0150146 A1 | 8/2004 | Takeo et al. | |
| 2005/0127585 A1* | 6/2005 | Maeno | F16F 13/264 267/140.11 |
| 2013/0313399 A1* | 11/2013 | Tsutsumi | F16F 13/10 248/638 |
| 2017/0036525 A1* | 2/2017 | Chern | B60K 5/1208 |
| 2017/0152911 A1* | 6/2017 | Kim | B60K 5/1208 |
| 2017/0267090 A1* | 9/2017 | Kim | B60K 5/1208 |
| 2017/0292581 A1* | 10/2017 | Han | F16F 13/107 |

* cited by examiner

ANTI-VIBRATION DEVICE AND DAMPER DEVICE

TECHNICAL FIELD

The present invention relates to an anti-vibration device and a damper device for supporting a vibration member such as an engine on a non-vibration member such as a vehicle body while reducing vibration.

BACKGROUND ART

A damper device used for a vehicle such as an automobile includes: a vibration-side bracket attached to an engine; a non-vibration-side bracket attached to a vehicle body; and an anti-vibration device (engine mount) provided between the vibration-side bracket and the non-vibration-side bracket.

The anti-vibration device includes: a first attachment member attached to the vibration-side bracket; a second attachment member attached to the non-vibration-side bracket; and an insulator provided between the first attachment member and the second attachment member.

In an example of the damper device described above, an engagement portion is formed on the non-vibration-side bracket, and a stopper portion (rebound stopper) to face the engagement portion is formed on the first attachment member (see Patent Literature 1, for example). In this configuration, the stopper portion comes into contact with the engagement portion, and thereby restricts the amount of extension of the anti-vibration device (the amount of movement of the first attachment member).

Incidentally, in another possible configuration, the stopper portion to face the engagement portion of the non-vibration-side bracket extends from the vibration-side bracket.

CITATION LIST

Patent Literature

Patent Literature 1: JP 2011-064258 A

SUMMARY OF INVENTION

Technical Problem

In the configuration where the stopper portion of the anti-vibration device or the vibration-side bracket comes into contact with the engagement portion of the non-vibration-side bracket as described above, it is desirable that collision noise due to the collision between the stopper portion and the engagement portion be prevented by a rubber member with which the engagement portion is covered. Since this requires a mold for covering the engagement portion with a rubber member, however, there arises a problem of high manufacturing costs for the non-vibration-side bracket.

Further, when the stopper portion is formed on the vibration-side bracket, the vibration-side bracket increases in size, resulting in a problem of an increase in weight of the vibration-side bracket.

The present invention aims to provide an anti-vibration device and a damper device which are capable of solving the above-mentioned problems, reducing the manufacturing costs for the brackets to be attached to the vibration member and the non-vibration member, and reducing the sizes and weights of the brackets.

Solution to Problem

For the purpose of solving the above problem, the present invention is an anti-vibration device which is provided between a vibration-side bracket attached to a vibration member and a non-vibration-side bracket attached to a non-vibration member. The anti-vibration device includes: a first attachment member attached to the vibration-side bracket; a second attachment member attached to the non-vibration-side bracket; and an insulator provided between the first attachment member and the second attachment member. The first attachment member includes a stopper portion which faces an engagement portion formed on the non-vibration-side bracket. The insulator includes a cover portion which covers at least a surface of the stopper portion facing the engagement portion.

In the anti-vibration device of the present invention, the stopper portion of the first attachment member comes into contact with the engagement portion of the non-vibration-side bracket, which makes it possible to restrict the amount of extension of the anti-vibration device. Further, since the cover portion of the insulator covers the stopper portion, it is possible to prevent collision noise when the stopper portion and the engagement portion collide with each other.

Moreover, in the anti-vibration device of the present invention, the cover portion of the insulator covers the stopper portion. This eliminates the necessity of covering the engagement portion of the non-vibration-side bracket with a rubber member. As a result, it is possible to reduce the number of molds for manufacturing the non-vibration-side bracket, and thus to reduce the manufacturing costs for the non-vibration-side bracket.

Furthermore, since there is no need for a stopper portion formed on the vibration-side bracket in the anti-vibration device of the present invention, it is possible to downsize and reduce the weight of the vibration-side bracket, and to reduce the manufacturing costs of the vibration-side bracket.

In the anti-vibration device described above, if the cover portion covers a region of the first attachment member facing an end surface of the engagement portion, it is possible to prevent collision noise when the first attachment member collides with the engagement portion.

A damper device of the present invention includes: a vibration-side bracket attached to a vibration member; a non-vibration-side bracket attached to a non-vibration member; and the above-described anti-vibration device which is provided between the vibration-side bracket and the non-vibration-side bracket. The non-vibration-side bracket includes a first bracket to which the anti-vibration device is attached and a second bracket attached to the first bracket, and the engagement portion is formed on the second bracket.

The foregoing anti-vibration device is used in the damper device of the present invention. This makes it possible to prevent collision noise when the stopper portion and the engagement portion collide with each other, to downsize and reduce the weights of the brackets, and to reduce the manufacturing costs for the brackets.

Still further, in the damper device of the present invention, the second bracket can be attached to the first bracket after the anti-vibration device is attached to the first bracket. To put it differently, in the present invention, it is possible to easily fasten the anti-vibration device having the stopper portion to the non-vibration-side bracket.

Advantageous Effects of Invention

An anti-vibration device and a damper device of the present invention are capable of reducing the manufacturing costs for the brackets, and downsizing and reducing the weights of the brackets. Furthermore, in the damper device of the present invention, the anti-vibration device is easy to fasten to the brackets.

DESCRIPTION OF EMBODIMENTS

Figure 2:
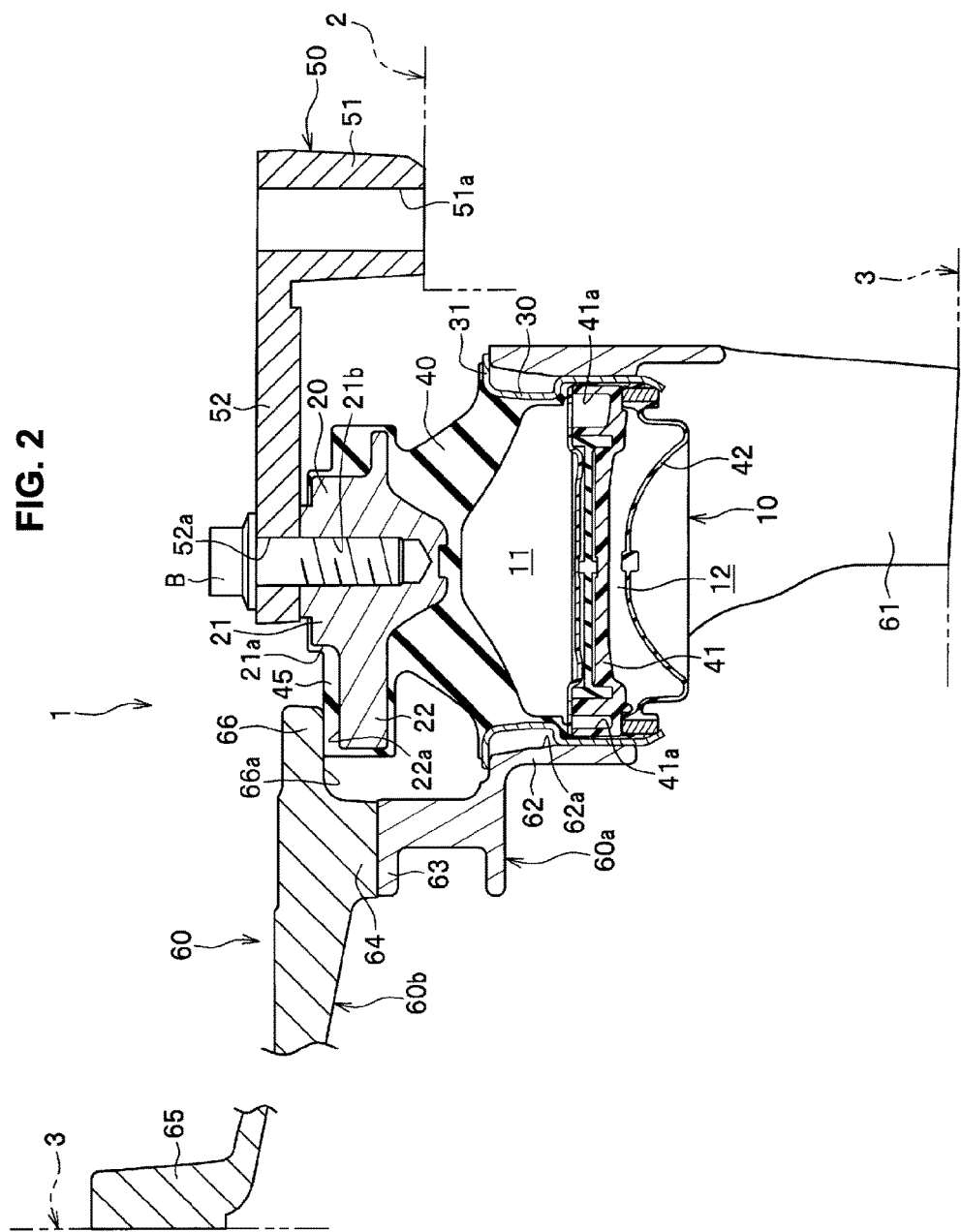
FIG. 2 is a side cross-sectional view showing the damper device according to the embodiment of the present invention.

An embodiment of present invention will be described in detail with reference to the drawings as needed. As illustrated in FIG. 2, a damper device 1 of the embodiment is provided between an engine 2 ("vibration member" in the claims) of a vehicle such as an automobile and a vehicle body 3 ("non-vibration member" in the claims).

Here, the vibration member means a source of vibration (for example, an engine and a motor). Also, the non-vibration member means a member to which vibration is desirably not transmitted (for example, a vehicle body).

Figure 1:
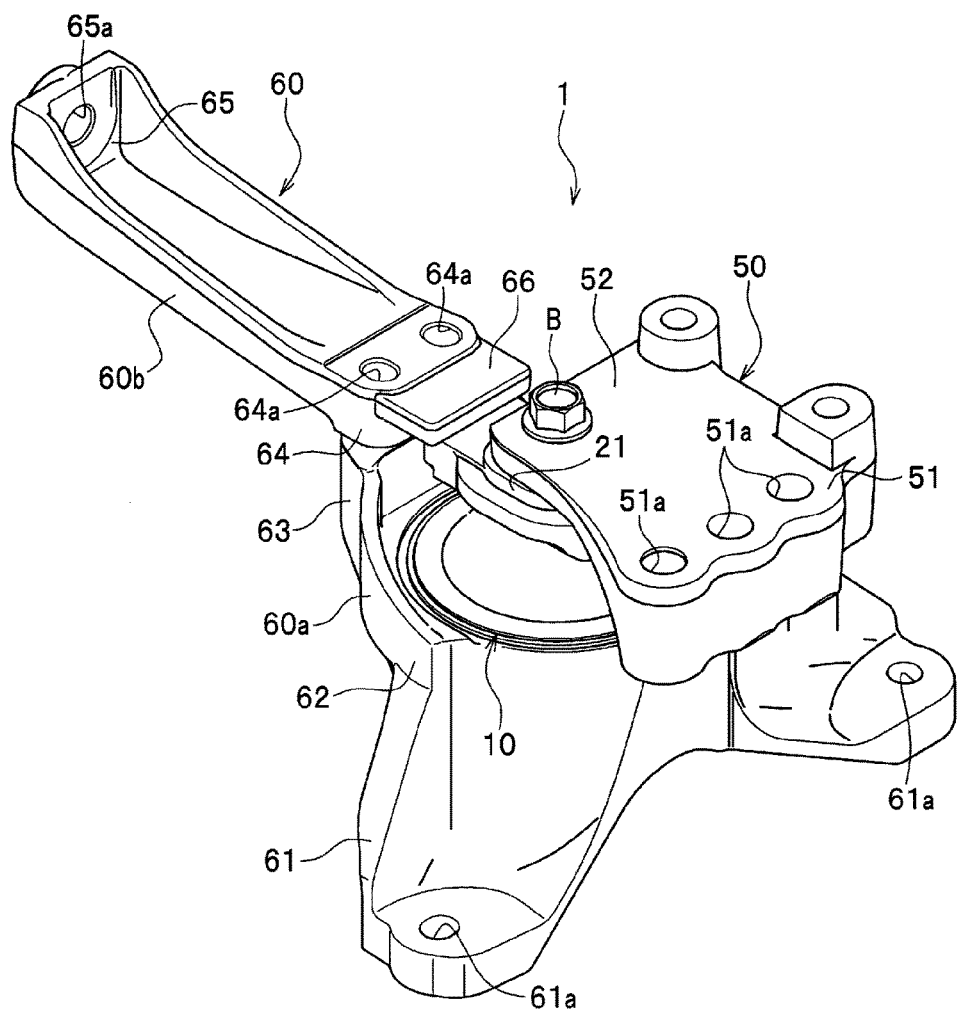
FIG. 1 is a perspective view showing a damper device according to an embodiment of the present invention.

The damper device 1 includes: a vibration-side bracket 50 attached to the engine 2; a non-vibration-side bracket 60 attached to the vehicle body 3; and an anti-vibration device 10 provided between the vibration-side bracket 50 and the non-vibration-side bracket 60 (see FIG. 1).

The vibration-side bracket 50 is a metal member. Formed on the vibration-side bracket 50 are: an engine attachment portion 51 to be attached to the engine 2; and an anti-vibration device attachment portion 52 to be attached to the anti-vibration device 10 (see FIG. 1).

The engine attachment portion 51 has a plurality of through holes 51a formed therein. The engine attachment portion 51 is fixed to the engine 2 using bolts (not illustrated) inserted through the through holes 51a.

The anti-vibration device attachment portion 52 projects from the engine attachment portion 51 in a lateral direction. An insertion hole 52a penetrates a distal end portion of the anti-vibration device attachment portion 52 in an up-down direction.

The non-vibration-side bracket 60 is a metal member. The non-vibration-side bracket 60 includes: a first bracket 60a; and a second bracket 60b attached above the first bracket 60a. In this manner, the non-vibration-side bracket 60 is separated in two members, upper one and lower one.

Formed on the first bracket 60a are: vehicle body attachment portions 61 to be attached to the vehicle body 3; an anti-vibration device attachment portion 62 to be attached to the anti-vibration device 10; and a joint portion 63 to which the second bracket 60b is attached (see FIG. 1).

An opening portion 62a of the anti-vibration device attachment portion 62 is a portion into which a second attachment member 30 of the anti-vibration device 10 to be described later is press-fitted.

The vehicle body attachment portions 61 of the first bracket 60a protrude downward from the anti-vibration device attachment portion 62. A lower end portion of each of the vehicle body attachment portions 61 has a plurality of through holes 61a formed therein (see FIG. 1). Each vehicle body attachment portion 61 is fixed to the vehicle body 3 using a bolt (not illustrated) inserted through the through holes 61a.

The joint portion 63 of the first bracket 60a protrudes upward from an upper end portion (upper end portion on the left side in FIG. 2) of the anti-vibration device attachment portion 62. A screw hole (not illustrated) is formed in an upper surface of the joint portion 63.

Formed on the second bracket 60b are: a joint portion 64 attached to the first bracket 60a; a vehicle body attachment portion 65 to be attached to the vehicle body 3; and an engagement portion 66 which restricts the amount of upward extension of the anti-vibration device 10 (see FIG. 1).

The joint portion 64 of the second bracket 60b is a portion attached to the upper surface of the joint portion 63 of the first bracket 60a. A plurality of through holes 64a (see FIG. 1) penetrates the joint portion 64 of the second bracket 60b. Bolts (not illustrated) inserted through these through holes 64a are screwed into screw holes (not illustrated) of the joint portion 63 of the first bracket 60a, and thus both the joint portions 63, 64 are joined.

The vehicle body attachment portion 65 of the second bracket 60b protrudes outward (toward the left side in FIG. 2) from the joint portion 64. A through hole 65a (see FIG. 1) is formed in a distal end portion of the vehicle body attachment portion 65. The vehicle body attachment portion 65 is fixed to the vehicle body 3 using a bolt (not illustrated) inserted through the through hole 65a.

The engagement portion 66 projects inward (toward the right side in FIG. 2) from an upper portion of the joint portion 64. A distal end portion of the engagement portion 66 is located immediately above the opening portion 62a of the first bracket 60a.

The anti-vibration device 10 is a liquid-filled engine mount provided between the vibration-side bracket 50 and the non-vibration-side bracket 60.

The anti-vibration device 10 includes: a first attachment member 20 attached to the vibration-side bracket 50; the second attachment member 30 attached to the non-vibration-side bracket 60; and an insulator 40 provided between the first attachment member 20 and the second attachment member 30.

The first attachment member 20 is a metal member which is fabricated by insert molding and which is located on an upper end portion of the insulator 40.

Formed in the first attachment member 20 is an attachment portion 21 to which the vibration-side bracket 50 is attached. A screw hole 21b is formed in a central portion of an upper end surface of the attachment portion 21.

Formed on the first attachment member 20 is a plate-shaped stopper portion 22 which projects from the attachment portion 21 toward the second bracket 60b side (toward the left side of FIG. 2).

As described later, the stopper portion 22 is a rebound stopper which comes into contact with a lower surface 66a of the engagement portion 66, thereby restricting the amount of upward extension of the anti-vibration device 10 (amount of upward movement of the first attachment member 20).

The second attachment member 30 is a cylindrical metal member into which a lower end portion of the insulator 40 is fitted.

A flange portion 31, protruding radially outward, is formed on a rim of the opening in the upper portion of the second attachment member 30.

The insulator 40 is a rubber elastic member which is shaped substantially in a circular truncated cone. There is an internal space below the insulator 40 which is opening downward.

The insulator 40 has the insert-molded first attachment member 20 formed on the upper end portion thereof.

Besides, the insulator 40 has a cover portion 45 which covers an outer circumferential surface 21a of the attachment portion 21 of the first attachment member 20 and the stopper portion 22.

In the embodiment, the rubber member covers almost the entirety of the first attachment member 20, and only the upper end surface of the attachment portion 21 is exposed to the outside.

The lower end portion of the insulator 40 is formed cylindrically along an inner circumferential surface of the second attachment member 30, and is vulcanization-bonded to the inner circumferential surface of the second attachment member 30.

A resin partition member 41 is attached inside the insulator 40. This partition member 41 partitions the internal space of the insulator 40 into an upper one and a lower one.

A primary liquid chamber 11 is formed above the partition member 41. The primary liquid chamber 11 is a space surrounded by an inner surface of the insulator 40 and an upper surface of the partition member 41, and contains incompressible working fluid therein.

Inside the insulator 40, a rubber diaphragm 42 is attached below the partition member 41. This diaphragm 42 closes an opening portion on the lower side of the insulator 40.

A secondary liquid chamber 12 is formed between the partition member 41 and the diaphragm 42. The secondary liquid chamber 12 is a space surrounded by a lower surface of the partition member 41 and an upper surface of the diaphragm 42, and contains incompressible working fluid therein.

Formed in the partition member 41 is an orifice passage 41a which establishes communication between the primary liquid chamber 11 and the secondary liquid chamber 12.

Figure 3:
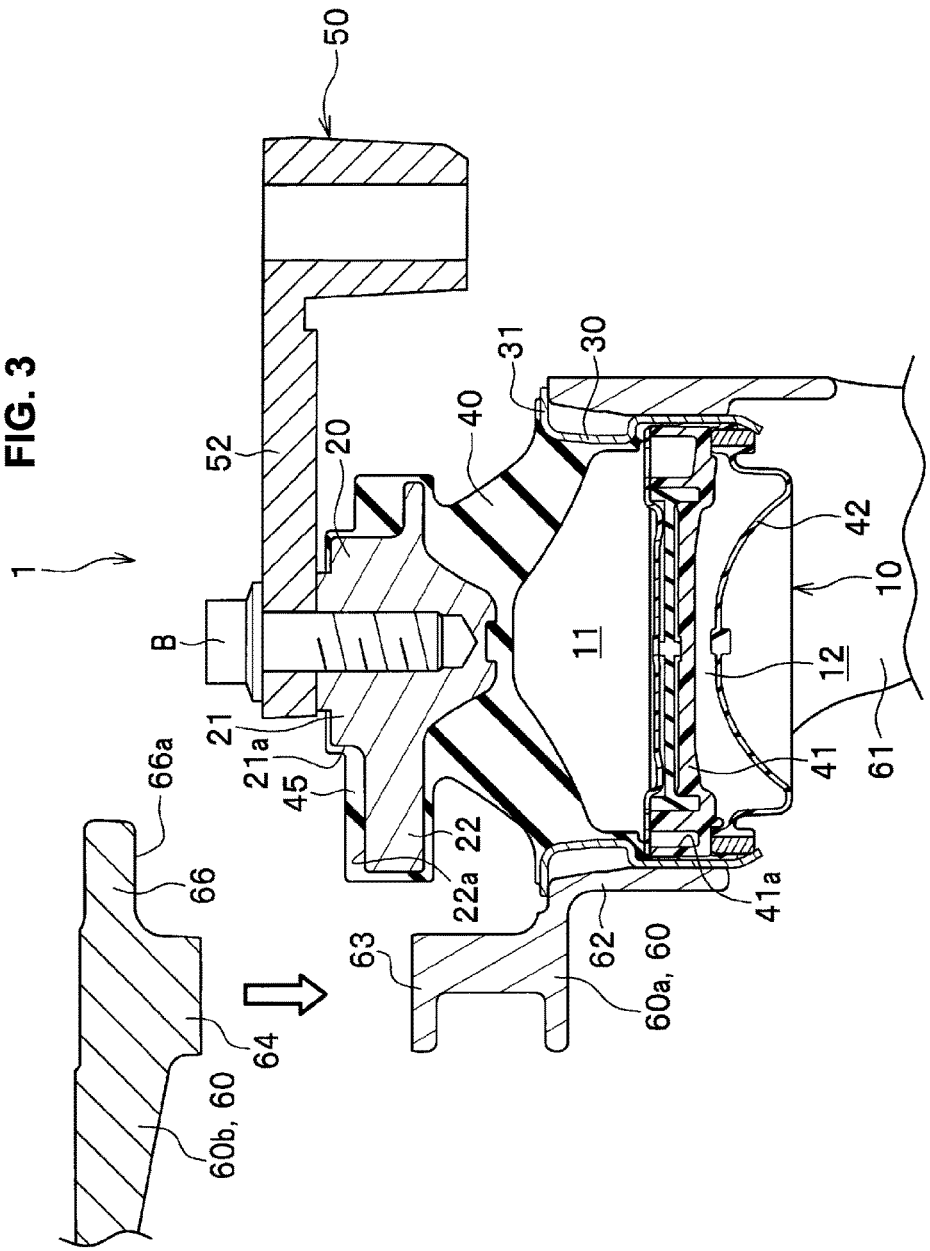
FIG. 3 is a side cross-sectional view showing a situation where an anti-vibration device is being attached to a non-vibration-side bracket, in the damper device according to the embodiment of the present invention.

A structure will be described where the vibration-side bracket 50 and the non-vibration-side bracket 60 are attached to the anti-vibration device 10, as illustrated in FIG. 3.

The second attachment member 30 is press-fitted from above into the opening portion 62a of the anti-vibration device attachment portion 62, with the second bracket 60b being detached from the first bracket 60a of the non-vibration-side bracket 60.

Here, the configuration is such that the second attachment member 30 will not fall off through the opening portion 62a because the flange portion 31 of the second attachment member 30 is in contact with an upper opening rim of the opening portion 62a.

After the second attachment member 30 is fastened to the first bracket 60a, the joint portion 64 of the second bracket 60b is joined to the joint portion 63 of the first bracket 60a.

In this way, the stopper portion 22 of the first attachment member 20 is located immediately below the engagement portion 66 of the second bracket 60b.

The stopper portion 22 and the engagement portion 66 are spaced apart in the up-down direction. An upper surface 22a of the stopper portion 22 faces the lower surface 66a of the engagement portion 66.

In the embodiment, the cover portion 45 covering the upper surface 22a of the stopper portion 22 and the lower surface 66a of the engagement portion 66 are in contact with each other.

The stopper portion 22 of the first attachment member 20 is disposed laterally next to the joint portion 64 of the second bracket 60b. The stopper portion 22 and the joint portion 64 are spaced apart in a lateral direction.

The outer circumferential surface 21a of the attachment portion 21 and the engagement portion 66 of the second bracket 60b are spaced apart in the lateral direction.

Furthermore, the anti-vibration device attachment portion 52 of the vibration-side bracket 50 is mounted on the upper end surface of the attachment portion 21 of the first attachment member 20. Then, a bolt B, inserted through the insertion hole 52a of the anti-vibration device attachment portion 52, is screwed into the screw hole 21b of the attachment portion 21. In this way, the first attachment member 20 is attached to the vibration-side bracket 50.

In such a manner, the anti-vibration device 10 attached to both the brackets 50, 60 is configured such that elastic deformation of the insulator 40 absorbs the vibration inputted through the vibration-side bracket 50 from the engine 2.

In addition, the anti-vibration device 10 is configured such that when the vibration causes the elastic deformation of the insulator 40, the working fluid flows through the orifice passage 41a to produce liquid column resonance inside the orifice passage 41a, thus attenuating the vibration.

Note that when the insulator 40 extends upward and the first attachment member 20 moves upward, the stopper portion comes into contact with the lower surface 66a of the engagement portion 66, whereby the amount of upward movement of the first attachment member 20 is restricted.

As described above, the stopper portion 22 and the engagement portion 66 determines the amount of upward extension of the anti-vibration device 10, that is, the maximum stroke of the anti-vibration device 10.

In the foregoing damper device 1, the cover portion 45 of the insulator 40 covers the stopper portion 22 of the anti-vibration device 10. For this reason, it is possible to prevent collision noise when the stopper portion 22 and the engagement portion 66 of the non-vibration-side bracket 60 collide with each other.

Moreover, in the anti-vibration device 10, the cover portion 45 formed unitary with the insulator 40 covers the stopper portion 22. This eliminates the necessity of covering the engagement portion 66 of the non-vibration-side bracket 60 with a rubber member, as in the conventional technique. As a result, it is possible to reduce the number of molds for manufacturing the non-vibration-side bracket 60, and thus to reduce the manufacturing costs for the non-vibration-side bracket 60.

Furthermore, since there is no need for a stopper portion formed on the vibration-side bracket 50 in the damper device 1, it is possible to downsize and reduce the weight of the vibration-side bracket 50, and to reduce the manufacturing costs of the vibration-side bracket 50.

What is more, in the anti-vibration device 10, the outer circumferential surface 21a of the attachment portion 21 of the first attachment member 20 is covered with the cover portion 45 of the insulator 40. For this reason, it is possible to prevent collision noise when the first attachment member 20 moves in the lateral direction and the attachment portion 21 collides with the engagement portion 66 of the non-vibration-side bracket 60.

Still further, in the damper device 1, the non-vibration-side bracket 60 is separated in the first bracket 60a and the second bracket 60b.

In this configuration, as illustrated in FIG. 3, the second bracket 60b is detached from the first bracket 60a before the anti-vibration device 10 is fastened to the non-vibration-side bracket 60. Then, after the anti-vibration device 10 is attached to the first bracket 60a, the second bracket 60b is attached to the first bracket 60a. This allows the engagement portion 66 of the second bracket 60b to face the upper portion of the stopper portion 22 of the first attachment member 20, as illustrated in FIG. 2. In such a manner, it is possible to easily fasten the anti-vibration device 10 having the stopper portion 22 to the non-vibration-side bracket 60.

The embodiment of the present invention has been described above. It should be noted, however, that the present invention is not limited to the foregoing embodiment, but can be modified as needed without departing from the scope and the spirit thereof.

For instance, although the cover portion 45 in the embodiment covers an upper surface 20a of the first attachment member 20, the outer circumferential surface 21a of the attachment portion 21, and the entirety of the stopper portion 22 as illustrated in FIG. 2, the cover portion 45 may cover at least the upper surface 22a of the stopper portion 22.

Although the cover portion 45 covers the entire outer circumferential surface 21a of the attachment portion 21 of the first attachment member 20 in the embodiment, the cover portion 45 may cover at least a region of the outer circumferential surface 21a of the attachment portion 21 which faces the engagement portion 66 of the non-vibration-side bracket 60.

Although the damper device 1 of the embodiment is provided between the engine 2 being the vibration member and the vehicle body 3 being the non-vibration member, no limitation is imposed on the damper device of the present invention, and on the vibration member and the non-vibration member to which the anti-vibration device is applicable.

REFERENCE SIGNS LIST

1: damper device
2: engine (vibration member)
3: vehicle body (non-vibration member)
10: anti-vibration device
11: primary liquid chamber
12: secondary liquid chamber
20: first attachment member
21: attachment portion
21a: outer circumferential surface
22: stopper portion
30: second attachment member
40: insulator
41: partition member
41a: orifice passage
42: diaphragm
45: cover portion
50: vibration-side bracket
51: engine attachment portion
52: anti-vibration device attachment portion
60: non-vibration-side bracket
60a: first bracket
60b: second bracket
61: vehicle body attachment portion
62: anti-vibration device attachment portion
62a: opening portion
63: joint portion
64: joint portion
65: vehicle body attachment portion
66: engagement portion
B: bolt

The invention claimed is:

1. An anti-vibration device which is configured to be provided between a vibration-side bracket attached to a vibration member and a non-vibration-side bracket attached to a non-vibration member, the anti-vibration device comprising:
  a first attachment member configured to be attached to the vibration-side bracket, the first attachment member comprising:
    an attachment portion disposed at an upper end of the first attachment member, the attachment portion attachable to the vibration-side bracket, the attachment portion including an outer circumferential surface; and
    a stopper portion positioned beneath the attachment portion, the stopper portion projecting outward from the first attachment member in a single first direction;
  a second attachment member configured to be attached to the non-vibration-side bracket; and
  an insulator provided between the first attachment member and the second attachment member, wherein:
    the stopper portion is configured to face an engagement portion formed on the non-vibration-side bracket, the engagement portion configured to project from the non-vibration-side bracket in a single second direction that is opposite the single first direction,
    the insulator includes a cover portion which covers an upper surface of the stopper portion that is configured to face a lower surface of the engagement portion,
    the cover portion further covers at least a portion of the outer circumferential surface that is configured to face an end surface of the engagement portion,
    the cover portion is configured to prevent direct contact between the upper surface of the stopper portion and the lower surface of the engagement portion when the anti-vibration device moves vertically relative to the non-vibration-side bracket to prevent collision noise, and
    the cover portion is configured to prevent direct contact between the end surface of the engagement portion and the portion of the outer circumferential surface that is configured to face the end surface of the engagement portion when the anti-vibration device moves laterally relative to the non-vibration-side bracket to prevent collision noise.

2. The anti-vibration device according to claim 1, wherein the cover portion is formed unitary with the insulator.

3. A damper device comprising:
  a vibration-side bracket attached to a vibration member;
  a non-vibration-side bracket attached to a non-vibration member; and
  the anti-vibration device according to claim 1 or 2 which is provided between the vibration-side bracket and the non-vibration-side bracket, wherein:
    the non-vibration-side bracket includes:
      a first bracket to which the anti-vibration device is attached, and
      a second bracket attached to the first bracket,
    the engagement portion is formed on a first end of the second bracket, and
    a second end of the second bracket opposite the first end of the second bracket includes an attachment portion configured to be attached to the non-vibration-side member.

4. A damper device comprising:
a vibration-side bracket attached to a vibration member;
a non-vibration-side bracket attached to a non-vibration member; and
the anti-vibration device according to claim 1 or 2 which is provided between the vibration-side bracket and the non-vibration-side bracket, wherein:
the non-vibration-side bracket includes:
   a first bracket to which the anti-vibration device is attached, and
   a second bracket attached to the first bracket,
the engagement portion is formed on the second bracket, and
the second attachment member of the anti-vibration device is press-fit into an opening portion of the first bracket of the non-vibration-side bracket.

\* \* \* \* \*